United States Patent
Kozlov (10) Patent No.: US 7,313,758 B2
(45) Date of Patent: Dec. 25, 2007

(54) MARKUP-LANGUAGE DOCUMENT FORMATTING IN MEMORY-CONSTRAINED ENVIRONMENT

(75) Inventor: Dmitri Kozlov, Lane Cove (AU)

(73) Assignee: Canon Kabushiki Kaisha, Tokyo (JP)

( * ) Notice: Subject to any disclaimer, the term of this patent is extended or adjusted under 35 U.S.C. 154(b) by 303 days.

(21) Appl. No.: 10/421,770

(22) Filed: Apr. 24, 2003

(65) Prior Publication Data

US 2003/0221168 A1    Nov. 27, 2003

(30) Foreign Application Priority Data

Apr. 24, 2002   (AU)  .................... PS1947

(51) Int. Cl.
  *G06F 17/00*  (2006.01)
(52) U.S. Cl. ............... 715/513; 715/509; 715/517
(58) Field of Classification Search ............ 715/513, 715/517, 509, 510
See application file for complete search history.

(56) References Cited

U.S. PATENT DOCUMENTS

| | | | |
|---|---|---|---|
| 5,708,806 A | 1/1998 | DeRose et al. | 707/104.1 |
| 5,860,073 A | 1/1999 | Ferrel et al. | 715/522 |
| 6,230,173 B1 | 5/2001 | Ferrel et al. | 715/513 |
| 6,639,611 B1 * | 10/2003 | Leduc | 715/764 |
| 6,675,351 B1 * | 1/2004 | Leduc | 715/503 |
| 6,757,870 B1 * | 6/2004 | Stinger | 715/513 |

OTHER PUBLICATIONS

"Introduction to Recursion", Jul. 2000, http://personal.vsnl.com/erwin/recintro.htm.*
"Cascading Style Sheets, level 2 CSS2 Specification", W3C Recommendation, May 12, 1998. <http://www.w3.org/TR/1998/REC-CSS2-19980512>.
P. Breuer, et al. "A Concrete Z Grammar", Dec. 1994. <http://www.citeseer.ist.psu.edu/breuer94concrete.html>.
"Introduction to Recursion", Tom Kelliher, Feb. 23, 1996, http://phoenix.goucher.edu/~kelliher/cs18/feb23.html.

* cited by examiner

*Primary Examiner*—Stephen Hong
*Assistant Examiner*—Adam M. Queler
(74) *Attorney, Agent, or Firm*—Fitzpatrick, Cella, Harper & Scinto (57) ABSTRACT

Methods (600, 700, 900), apparatuses and computer program products are disclosed for parsing and formatting a document encoded using a markup language in a memory-constrained environment. The structure (100) of the document is represented by a tree having one or more nodes (n1-n10). One method (600) includes the steps of, for a current one of the nodes, freeing memory occupied by any previously formatted one of the nodes upon which formatting of the current node, according to a set of formatting rules, is independent; and building a partial document tree (500) using the current node and remaining previously formatted nodes upon which formatting of the current node, according to the set of formatting rules, is dependent. Another method includes the steps of obtaining information about one or more nodes of the document using a lookahead parser, and formatting the one or more nodes using the obtained information.

18 Claims, 9 Drawing Sheets

(PRIOR ART)

MARKUP-LANGUAGE DOCUMENT FORMATTING IN MEMORY-CONSTRAINED ENVIRONMENT

FIELD OF INVENTION

The present invention relates generally to markup-language documents and, in particular, to parsing and formatting of markup-language documents.

BACKGROUND

Parsing is a process of extracting information from a document. The process can in general yield either a tree structure description of the document, or a logical chain of events. Tree-based parsers compile a document into an internal tree structure, providing a hierarchical model that applications are able to navigate. On the other hand, event-based parsers report parsing events, such as the start and end of elements, directly to the application for which the parsing is being performed.

Formatting is a process of preparing a document's information for output on human-readable media (e.g. a computer monitor or printed paper) according to preset specifications. Formatting always builds on parsing results.

A markup language provides a way of structuring document information. Examples of such languages include HyperText Markup Language (HTML), Extensible HyperText Markup Language (XHTML), Scalable Vector Graphics (SVG) and eXtensible Markup Language (XML) in general. In turn, a tree structure provides a natural model for representation of structural documents, and that model is suitable for processing by a computer application. Each markup element defines a node in a tree in this model.

Style sheets provide a mechanism for adding styles (e.g. fonts, colors, and spacing) to structured documents. The World-Wide Web (www) consortium has actively promoted the use of style sheets on the Web since the consortium was founded in 1994. The consortium has produced several recommendations including Cascading Style Sheets (CSS), XML Path Language (XPATH), and Extensible Stylesheet Language Transformations (XSLT). CSS language has been widely adopted on the Web. The CSS language considers elements in relation to other elements (e.g., parent-child, sibling-sibling, ancestor-descendant). To format elements, their relationships with other elements of a structural document must be known. Again, the tree structure is well suited to describe such types of relationships.

Whatever parsing method is used, a tree structure is essential for formatting of markup-language documents. Even if an event-based parser does not require an internal tree structure, the formatting process needs a full or partial document tree representation. To format a structured document, the tree structure is traversed from the upper nodes to the lower nodes. When a node having character data is reached, relevant style information is retrieved from style rules and applied to the node element. In this manner, document elements are prepared for output. Node relationships with other document nodes are encoded in the tree structure. This is described in greater detail in relation to FIG. 11.

Figure 11:
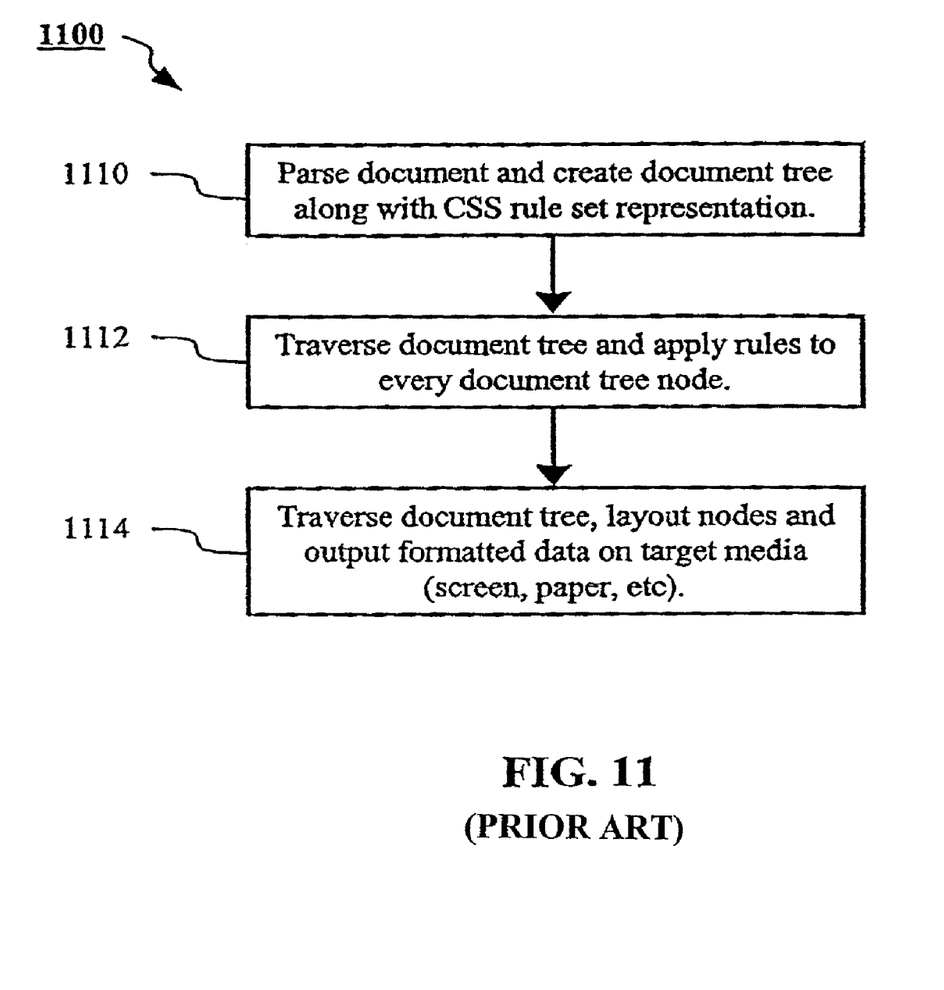
FIG. 11 is a flow diagram of a process for parsing and formatting a document.

FIG. 11 is a flow diagram illustrating steps of a process 1100 for parsing and formatting of markup documents. In step 1110, the process 1100 parses a document and builds an internal representation of the document in a tree structure. The step 1110 is also responsible for building a representation of CSS rules, which are found in the document. Following the step 1110, the step 1112 traverses the document tree from the upper nodes to the lower nodes. When a node having character data is reached, relevant style information is retrieved from the style rules and applied to the node element, thus preparing document elements for output. The next step 1114 traverses the document tree again and lays out and outputs document nodes to a target media (e.g., screen, paper, and the like). Steps 1112 and 1114 maybe combined to avoid additional traversals of the document tree.

The described process of parsing and formatting a document has several significant limitations and/or disadvantages.

One disadvantage is that the tree structure places a strain on system resources. The amount of memory required to store a full document tree is theoretically unlimited. Further, the memory requirements depend not only on document size, but also on document structure complexity. This constitutes a significant disadvantage, because the process 1100 requires significant amounts of memory to work successfully.

Yet another disadvantage of the process 1100 of FIG. 11 is that this process does not allow streaming processing. The process 1100 cannot layout a document and output the laid-out document to a target media until the full document is available. This is important for Internet applications when document downloading time may be noticeable for a user. Output of requested information should desirably start as soon as possible, before all data is copied from a remote server and available locally.

Another disadvantageous limitation of the process 1100 is that there is not much room remaining for recovery from memory allocation failures. If the process is unable to allocate memory for a next node in a tree, parsing of the document cannot continue. Thus, the process 1100 fails step 1110. Because steps 1110 and 1114 require successful completion of the step 1112, the entire process 1100 fails to accomplish its task.

Thus, a need clearly exists for an improved technique of parsing and formatting marking-language documents, which is advantageously adapted for a memory-constrained environment.

SUMMARY

In accordance with a first aspect of the invention, there is provided a method of parsing and formatting a document encoded using a markup language. The structure of the document is represented by a tree having one or more nodes. The method includes the steps of, for a current one of said nodes, freeing memory occupied by any previously formatted one of said nodes upon which formatting of said current node, according to a set of formatting rules, is independent; and building a partial document tree using the current node and remaining previously formatted nodes upon which formatting of said current node, according to said set of formatting rules, is dependent.

Preferably, the method includes the steps of formatting the document using the partial document tree and outputting the formatted document.

In accordance with a second aspect of the invention, there is provided a method of parsing and formatting a document encoded using a markup language. The structure of the document is represented by a tree having one or more nodes. The method includes the steps of: for a current one of the nodes, freeing memory occupied by any previously formatted one of the nodes upon which formatting of the current node, according to a set of formatting rules, is independent;

building a partial document tree using the current node and remaining previously formatted nodes upon which formatting of the current node, according to the set of formatting rules, is dependent; obtaining information about one or more nodes of the partial document tree using a lookahead parser; and formatting the one or more nodes using the obtained information.

Preferably, the method in accordance with the first or second aspect of the invention includes the step of determining the one or more nodes affected by the set of formatting rules. Further, the determining step may utilise one or more sequences of selectors, each sequence of selectors related to one of the formatting rules, applied to sibling nodes of the document tree. The determining step may include the step of searching each formatting rule in the set of formatting rules for the current node.

In accordance with a third aspect of the invention, there is provided a method of parsing and formatting a document encoded using a markup language. The structure of the document is represented by a tree having one or more nodes. The method includes the steps of obtaining information about one or more nodes of the document using a lookahead parser, and formatting the one or more nodes using the obtained information.

In accordance with further aspects of the invention, there are provided apparatuses and computer program products for parsing and formatting a document encoded using a markup language in accordance with each of the foregoing methods.

BRIEF DESCRIPTION OF THE DRAWINGS

A small number of embodiments are disclosed hereinafter with reference to the drawings, in which.

DETAILED DESCRIPTION

Methods, apparatuses, and computer program products for parsing and formatting one or more markup language documents in a memory-constrained environment are disclosed. The embodiments of the invention also relate to Cascading Style Sheets and in particular to parsing of Cascading Style Sheets. Numerous specific details are set forth in the following description. However, it will be apparent to those skilled in the art in view of this disclosure that modifications and changes may be made to the embodiments without departing from the scope and spirit of the invention.

Some portions of the following description are presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that the above and similar terms are to be associated with the appropriate physical quantities and are merely convenient labels applied to these quantities. Unless specifically stated otherwise, and as apparent from the following, discussions utilizing terms such as "reading", "deleting", "determining", "formatting", "running" "searching", "outputting", or the like, include the action and processes of a computer system, or similar electronic device, that manipulates and transforms data represented as physical (electronic) quantities within the registers and memories of the computer system into other data similarly represented as physical quantities within the computer system memories or registers or other such information storage, transmission or display devices.

Apparatuses are also disclosed for performing the operations of the methods. Such apparatus may be specially constructed for the required purposes, or may comprise a general-purpose computer or other device selectively activated or reconfigured by a computer program stored in the computer. The algorithms and displays presented herein are not inherently related to any particular computer or other apparatus. Various general-purpose machines may be used with programs in accordance with the teachings herein. Alternatively, the construction of more specialized apparatus to perform the required method steps may be appropriate. The structure of a conventional general-purpose computer will appear from the description below.

In addition, the present specification also discloses a computer readable medium comprising a computer program for performing the operations of the methods. The computer readable medium includes any transmission medium for communicating the computer program between a source and a destination. The transmission medium may include storage devices such as magnetic or optical disks, memory chips, or other storage devices suitable for interfacing with a computer. The transmission medium may also include a hardwired medium. The computer program is not intended to be limited to any particular programming language and implementation thereof. It will be appreciated that a variety of programming languages and coding thereof may be used to implement the teachings of the invention as described herein.

The embodiments of the invention are based on the concept that memory requirements of a structured document formatter can be reduced by one or more of the following:

Using a partial document tree optimized according to a rule set attached to the document; and Using a look-ahead parsing algorithm when the format of a node in the tree depends on descendant nodes and when there is insufficient memory available to use a fully functional parser.

Thus, one aspect of the invention is that it may not be necessary to build a fill document tree, as the rule set is used to reduce the document tree. A further aspect of the invention is using a lookahead parser because some markup languages such as XHTML cannot parse some elements right away to layout a document, with an example being a table. For a table, the width and height of a cell, which are dependent upon other cells, may be required to be found. The lookahead parser can read the full table and scan the table to find the width and height of a cell. Both aspects allow parsing in limited memory environments and facilitate recovery from memory allocation failures.

The embodiments of the invention have general applicability to the parsing and formatting of documents using a variety of markup languages. For ease of explanation, the embodiments are described with references to XHTML utilizing CSS2 style sheet language. This is not intended, however, to limit the scope of the invention, and modifications and/or changes may be made without departing from the scope and spirit of the invention. For example, the embodiments of the invention can also be applied to an HTML document with either version of CSS style sheets attached, or to XHTML with XSL-FO attached.

The preferred embodiment is described as a computer application program embedded in a printer device. However, those skilled in the art will recognize that the described embodiment is not limited to printers. For example, the preferred embodiment can be embedded into a device other than printer, or can be performed on a computer system running a general-purpose operating system.

Table 1 lists a sample document, which shall be used as an example for discussion of the drawings.

TABLE 1

```
<html xmlns="http://www.w3.org/1999/xhtml">
    <head>
        <title>Sample document 1</title>
    </head>
    <body>
        <h1>My home page</h1>
        <p>My favorite writers:</p>
        <ul>
            <li>Alexander Bulgakov</li>
            <li>Anton Chekhov</li>
            <li> J.R.R. Tolkien </li>
        </ul>
    </body>
</html>
```

Figure 1:
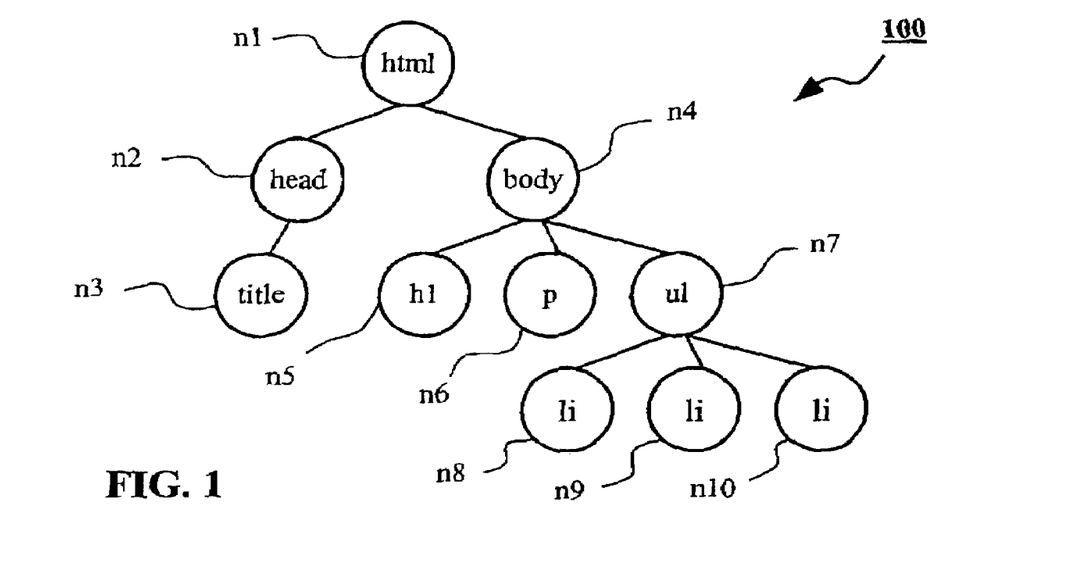
FIG. 1 is a node diagram illustrating a document tree of a sample document.

FIG. 1 depicts a fill tree structure of the sample document of Table 1. Reference numerals adjacent each (e.g. n1, n2, . . . ) tree node show the order of adding nodes to the tree. In FIG. 1, the highest tree node n1 corresponds to the HTML tag of the document in Table 1. From this highest node, nodes n2 and n4 corresponding to the head and body tags, respectively, are child nodes of parent node n1. In turn, node n3 corresponding to the title tag is a child node of node n2, reflecting the structure inherent in the sample document of Table 1. Correspondingly, the nodes n5, n6, and n7 corresponding to the h1, p, and ul tags are child nodes of node n4. Still further, nodes n8, n9, and n10 corresponding to the three li tags are child nodes of node n7.

Figure 4:
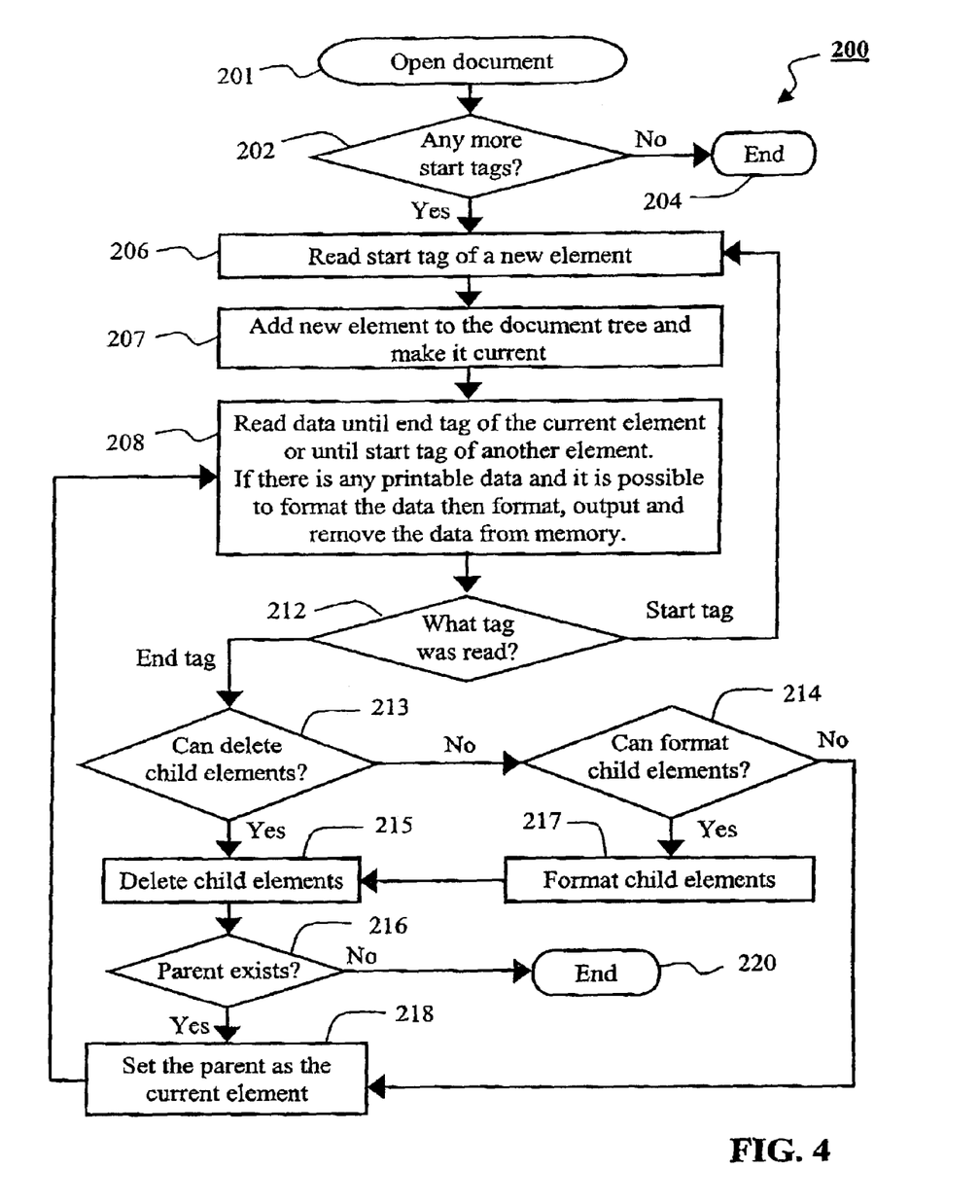
FIG. 4 is a flow diagram for a process of formatting a document using a partial document tree.

FIG. 4 depicts a process 200 that builds a partial tree in memory and formats document elements with which embodiments of the invention may be practiced. For the sake of simplicity error handling steps are missing from the diagram on the FIG. 4. It is assumed that an input document is a valid and well-formed XML document. Those skilled in the art will find it easy to add necessary steps related to error handling. In step 201, the parser opens a document and reads a document header. Thereafter, a decision step 202 checks whether the document contains any unprocessed elements. Any element begins with a start tag, so testing is performed by looking up a start tag. If a star tag is found, processing continues at step 206. If, however, further tags are not detected in the decision step 202, the parsing process 200 terminates in step 204.

In step 206, the start tag of a new element is read. In step 207, a structure for the new element is created, the element is stored, and the element is set as a current one.

In step 208, the element data in memory is read until the next tag is found. That is, the data is read until the end tag of the current element is reached or until another start tag of another element is found. If the element contains any printable/visible data and data can be formatted at this stage, step 208 formats and outputs data to a printer and frees any memory occupied by that data. If there is insufficient information to layout the element, the data stays in memory to be processed in subsequent steps.

After the step 208, a decision step 212 checks the type of the tag read in the step 208. A start tag means that the current element has another child element, and processing continues at step 206. An end tag means that the current element has been totally read through, and processing continues at step 213.

In step 213, a check is made to determine whether child elements of the current element can be removed from memory. This is the case when all child elements and their descendants have already been formatted in step 208. If child elements can be deleted (YES), process 200 continues at step 215. On the other hand, if child elements cannot be deleted (NO), process 200 continues at step 214.

The decision step 214 checks whether there is enough information to format and output the descendant elements. If the elements can be formatted (YES), processing continues at step 217. Formatting child elements in step 217 involves revisiting of all descendant elements of the current element. Processing continues at step 215.

If, on the contrary, the step 214 determines that the elements cannot be laid out at this stage (NO), processing continues at step 218. Step 218 sets the parent element as a current one. The process 200 cannot format elements when more information is required for formatting. The earlier decision step 212 revealed that the current element does not have any more unread child elements, which means the information can be obtained from the parent element, so the latter should exist in this case. From step 218, processing continues at step 208.

The process 200 may enter the step 215 from either the decision step 213 (YES) or the step 217. In both cases, child elements are not required any more, and the step 215 removes the child elements from memory. This step destroys the whole subtree with the root in the current element.

Following step 215, a decision step 216 checks whether the current element has a parent element. If this is the case (YES), the parent element becomes current in the next step 218. If, on the contrary (NO), there is no parent element, the process 200 terminates in step 220.

Figure 2:
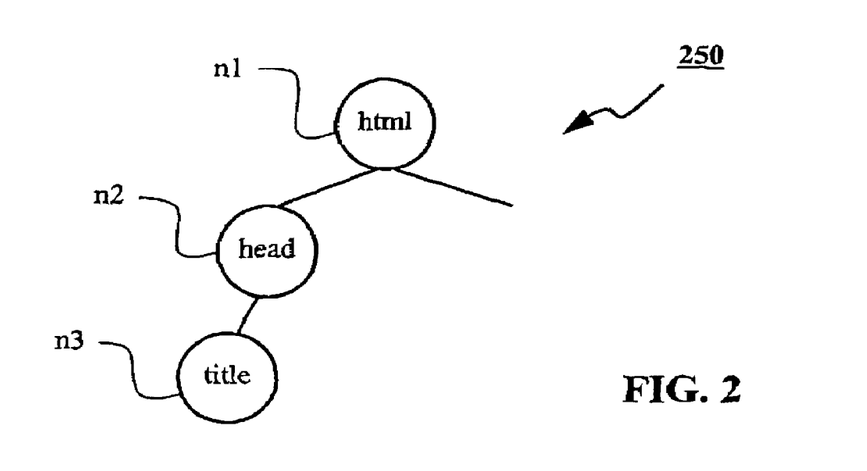
FIG. 2 is a node diagram illustrating a document tree required to format the node n3 of FIG. 1.

FIG. 2 depicts a partial tree structure 250 created by the process 200 of FIG. 4 when the node n3 is read. Node n2 is a child of node n1. The node n3 is a terminal node, its parent being node n2, and a branch leading to that node is stored in memory. Elements that are not yet created are not shown.

Figure 3:
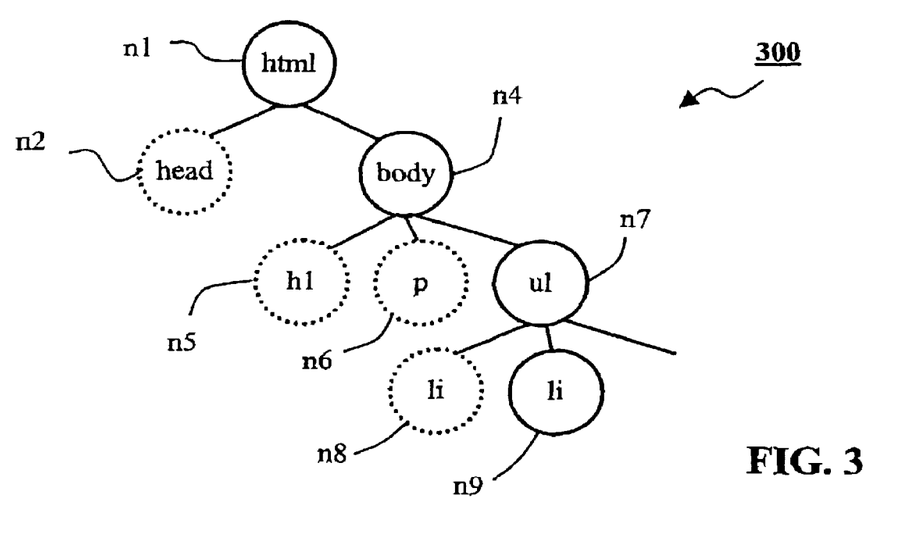
FIG. 3 is a node diagram illustrating a partial document tree required to format the node n9 of FIG. 1.

FIG. 3 shows the tree structure created by the process 200 when the node n9 is processed. Elements that are not yet created are omitted. The node n3 is not shown because that node has been formatted and removed from memory. The node n3 is not required for formatting of any other element left in the document. The nodes n2, n5, n6, and n8 are shown with dotted lines. The nodes n2, n5, n6 and n8 are siblings of nodes that have not been fully processed yet, and the process 200 may require knowledge of the relationships between these nodes and other document nodes. The process 200 keeps footprints of these nodes in memory. All data of the nodes n2, n5, n6, and n8 are removed from memory to occupy minimum space.

The process 200 does not make any assumptions on a style rule set attached to a document. All sibling elements sitting on a same branch of a document tree are kept in memory. Memory usage can be minimized by analyzing the rule set prior to building a document tree.

In CSS2 language (as described in "Cascading Style Sheets, level 2 CSS2 Specification W3C Recommendation May 12, 1998"), pattern matching rules determine which style rules apply to elements in the document tree. These patterns, called selectors, may range from simple element names to rich contextual patterns. If all conditions in the pattern are true for a certain element, the selector matches the element. The elements of the document tree that match a selector are called subjects of the selector. A selector is a chain of one or more simple selectors separated by combinators. Combinators are: whitespace, ">", and "+". There are selectors of different types in CSS. One of the types is called adjacent sibling selector or adjacent selector. Adjacent selectors have the following syntax: $E_0+E_1$, where $E_0$, $E_1$ are simple selectors. A document element $E_1$ matches the selector $E_0+E_1$ if $E_0$ and $E_1$ share the same parent in the document tree and $E_0$ immediately precedes $E_1$.

The process 600 of FIG. 6, described below, takes adjacent selectors into account in the course of building a document tree.

Let a rule set "A" be the one and only rule set attached to the document of Table 1. The rule set "A" does not have any rules that use adjacent selectors except a following rule given by Equation (1).

$$p+ul\{color:red\} \quad (1)$$

This rule states that if an element p immediately precedes an element ul then the element ul should be rendered in red color. In that case, a formatting process must keep track of relationships between elements p and sibling elements ul.

In this case, a formatting process can ignore all sibling relationships except the one expressed in Equation (1).

Figure 5:
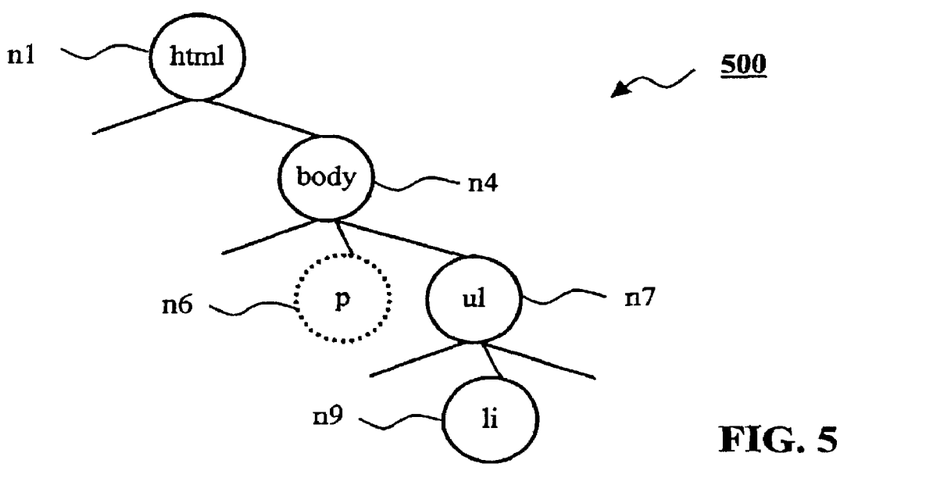
FIG. 5 is a node diagram of an optimised partial document tree required to format the node n9.

FIG. 5 depicts a partial tree 500 (based on the document having a full tree structure 300 of FIG. 3) required to format the node n9. The nodes n2, n5, and n8 are removed from memory. The remaining nodes of the partial tree 500 are n1, n4, n6, n7, and n9.

Figure 6:
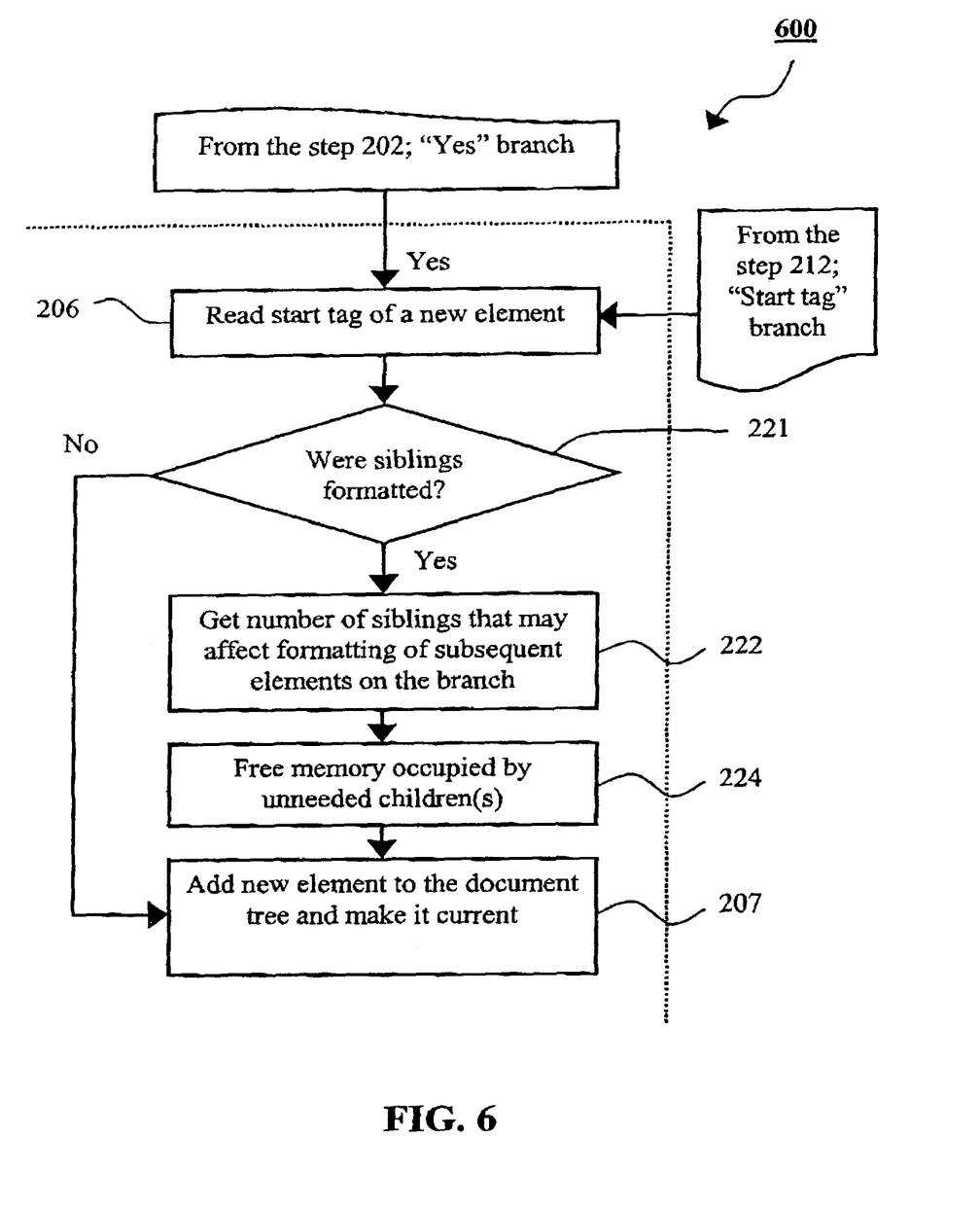
FIG. 6 is a flow diagram of a modification to the process of FIG. 4 to build optimized partial tree.

FIG. 6 shows modifications of the process 200. These modifications explain how to implement a process 600 from the process 200. Further steps are added in between steps 206 and 207 of FIG. 4. Relationships between nodes in the document tree are defined by a CSS style sheet. This process applies to style sheet rules, where there are siblings involving one or more rules. The document tree is partially built and then formatted nodes are deleted. Following step 206 that reads a next element tag and sets the element as a current one, the process 600 performs a decision step 221. The decision step 221 checks whether sibling elements have been formatted already and could possibly be removed. This verification is of the same nature as described above, where the step 213 is described. If the elements have not been formatted (NO), no optimization steps may be carried out and the process 600 goes to the step 207.

If there might be a possibility to remove the sibling elements (YES) in step 221 processing continues at step 222, which calculates the number of siblings of the current element that should be left in memory according to CSS rule set. That is, the number of siblings that may affect formatting of subsequent elements of the branch is determined. This involves nodes that are in parallel at a given level of a branch. Thus, in FIG. 1, nodes n8, n9, and n10 are all siblings. If the number of nodes currently stored in memory is more than required, step 224 frees memory occupied by unneeded elements and proceeds to the step 207. Further steps are the same as in the process 2000, described above.

Figure 7:
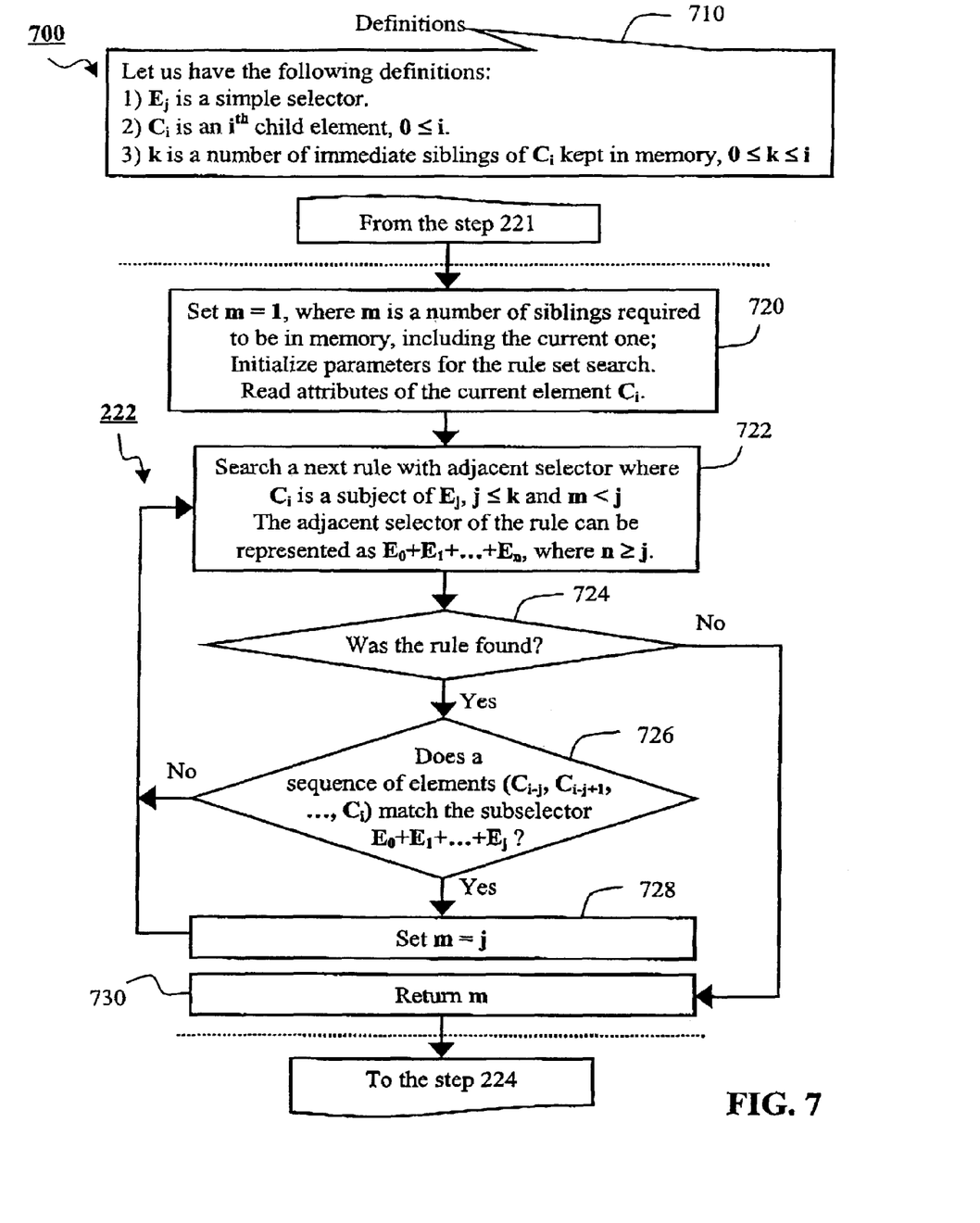
FIG. 7 is a flow diagram illustrating details of the step 222 of the process of FIG. 6.

FIG. 7 shows details of the step 222 of the process 600 described above. Definitions 710 introduce notation used in the FIG. 7. In particular, E is a simple selector, $C_i$ is an ith child element, $0 \leq i$, and k is a number of immediate siblings of $C_i$ kept in memory, $0 \leq k \leq i$. For example, the sequence $E_0+E_1+E_3$ denotes the arrangement of elements for a particular rule, that is the sequence represents the structure in a tree to which formatting is to be applied. The following is a generic expression for any rule in a rule set made up of selectors: $E^1_0+E^1_1+ \ldots +E^1_j$. Thus, $E^1_0+E^1_1+E^1_3$ may represent a first rule and $E^2_0+E^2_1$ may represent a second rule, for example.

Step 720 sets an initial value of a variable m, where m is the number of siblings that are required by CSS to be stored in memory for formatting of further elements. This variable holds a result of the step 222. The current elements are counted as well, so m is set to the value 1. The step 720 also initializes parameters of the rule set search process. The document elements may have attributes. The step 720 further reads attributes of the current element Ci. The attributes are used to perform tests against CSS rule selectors. That is, the attributes are used to see if the selectors match tree elements.

Following the step 720, step 722 searches a next rule in the rule set that has an adjacent selector with the following properties (note superscript for a particular rule is omitted):

1. The selector can be represented as $E_0+E_1+ \ldots E_j+ \ldots +E_n$, where $n>0$, $0 \leq j \leq n$, and $E_0, E_1, \ldots E_j, \ldots, E_n$ are simple selectors,
2. $j \leq k$, where k is the number of sibling elements currently stored in memory,
3. $m<j$, where m is the number of siblings required to be stored in memory, and
4. The current element $C_i$ is the subject of the simple selector $E_j$.

Decision step 724 checks if the rule with the above properties was found. If the rule was found (YES), the process 600 continues at decision step 726. Otherwise (NO), the process 600 advances from step 724 to step 730 and returns whatever value is stored in the variable m.

Decision step 726 checks whether the element Ci is a subject of a selector $E_0+E_1+ \ldots +E_j$. To do so, decision step 726 tests whether the element $C_{i-j}$ matches $E_0$, $C_{i-j+1}$ matches $E_1$, and so on until the element $C_{i-1}$ and the selector $E_{j-1}$.

If Ci is a subject of the selector $E_0+E_1+ \ldots +E_j$, then the process 600 sets the variable m to a value of j in step 728 and returns to the step 722. If, on the other hand, $C_i$ is not a subject of the above-specified selector (NO), the process 600 skips the step 728 and returns directly to the step 722.

As shown in FIG. 4, there are cases when the process 200 cannot format and output a document element immediately as the process reads the element. This also applies to the process 600. See description of the step 208 of FIG. 4. Consider the sample XHTML document listed in Table 2.

TABLE 2

```
<html xmlns="http://www.w3.org/1999/xhtml">
    <head>
        <title>Sample document 2</title>
    </head>
    <body>
        <table border="1" summary="Sample table">
            <caption><em>Fruit flies statistics</em>
            </caption>
            <tr>
                <th></th>
                <th>weight</th>
                <th>weight</th>
            </tr>
            <tr>
                <th>Males</th>
                <td>1.9</td>
                <td>0.003</td>
            </tr>
            <tr>
                <th>Females</th>
                <td>1.7</td>
                <td>0.002</td>
            </tr>
        </table>
    </body>
</html>
```

The document listed in Table 2 contains a table with 3 rows and 3 columns. No element in the table explicitly specifies the element's own dimensions. A document parser is supposed to calculate the table and element dimensions automatically. To find dimensions, a parser has to read the whole table up to a last table cell, because any cell may influence a width of the cell's column or a height of the cell's row. That means, for example, a table caption or a first cell in the table cannot be formatted until a last cell has been read.

Figure 8:
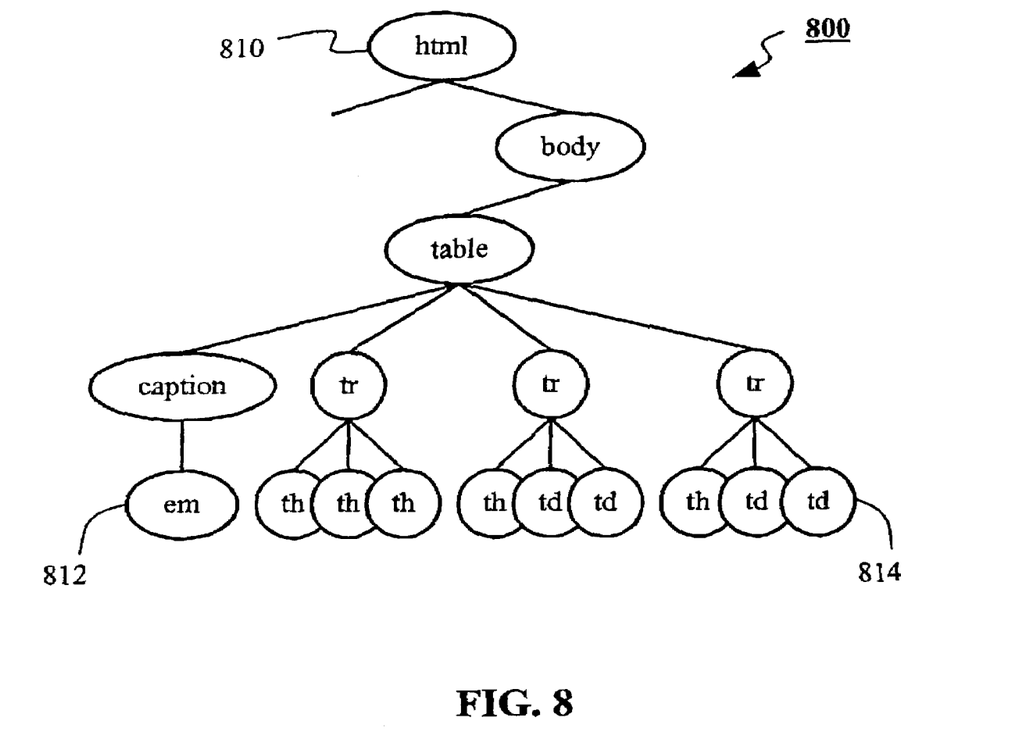
FIG. 8 is a node diagram of a partial document tree required to format a node 812.

FIG. 8 shows a tree 800 of the document of Table 2 stored in memory at a time when the process 200 passes the last table cell 814. Almost the entire document tree 800 is saved in memory. Not much memory is required in the simple case of FIG. 8, but those skilled in the art can easily envisage a table that takes a significant amount of memory to process using the described approach. Tables may contain nested tables or images.

As another example of a situation, when a document element cannot be formatted straight away, consider page-break-after and page-break-inside properties in CSS2. The following rules (2) apply to document elements $E_1$, $E_2$:

$E_1$ {page-break-after: avoid}

$E_1$, $E_2$ {page-break-inside: avoid}    (2)

In this example, a parser has to check an element that follows an element $E_1$ and, if it is an element $E_2$, the parser has to obtain page coordinates of the element $E_2$ before placing the element $E_1$ on a page. To comply with the rules (2), the parser may need to start rendering a new page.

Figure 9:
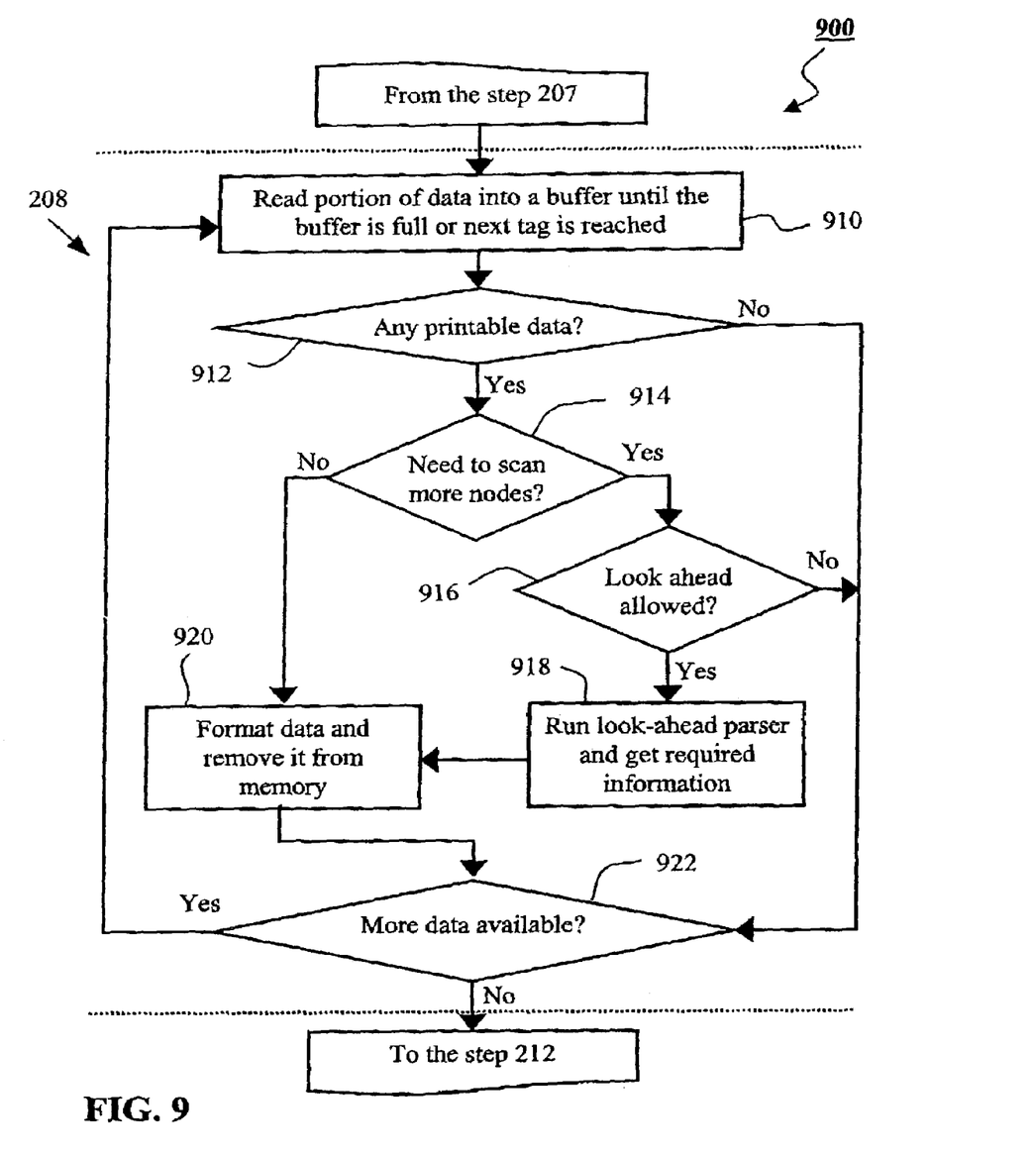
FIG. 9 is a flow diagram of a modification to the process of FIG. 6.

FIG. 9 shows modifications of the process 600. These modifications explain how to implement a process 900 based on the process 600. The process may have two modes of operation.

Normal mode has been described with reference FIGS. 4 and 6. Normal mode is a mode of execution in a richer memory environment. If the process 900 cannot format an element because the process requires information about elements that are located further down in a document, the process continues reading the document and builds a document subtree until the process gathers all required data. As soon as the necessary data has been obtained, the process 900 traverses the built subtree and formats elements of the subtree.

Look-ahead mode, shown in FIG. 9, is designed for a memory-constrained environment, when the process 900 is unable to build a subtree of a required depth FIG. 9 depicts the modified step 208 of FIG. 4. Following the step 207, step 910 reads element data into a buffer. The step 910 stops reading data in either of two cases: the buffer is full, or either an end tag of the current element or a start tag of a next element is reached. Step 910 does not copy the tag into the buffer.

Decision step 912 checks whether there is any printable or visible data in the buffer that can be formatted and sent to an output device. If the element has printable data (YES), processing continues at step 914. Otherwise (NO), the process 900 advances to step 922 to check if there is more data to read.

Decision step 914 checks whether formatting of the current element depends on elements located further down the document. If the answer is "?No", the process 900 can layout the element straight away and proceeds to step 920. Step 920 formats data, sends the formatted data to an output device and frees memory. Following step 920, the process 900 goes to step 922 to check if there is more input data available.

If step 914 finds that more information is required for formatting of the current element (YES), processing continues at step 916, which checks whether a look-ahead parser can be run to obtain data.

For performance sake it is feasible to run the look-ahead parser if absolutely necessary, i.e. insufficient memory to proceed otherwise. The process 900 may have, for example, a flag that is set in case of a memory allocation failure, or to desirably restrict memory consumption from the beginning. In case of a memory allocation problem, the process 900 traverses a document subtree stored in memory and frees memory taken by data, and then the process 900 may set the flag. While freeing memory, the process 900 preserves information required for formatting of elements from the top of the subtree.

If decision step 916 confirms that look-ahead mode is permitted, the process 900 advances to step 918 to run the look-ahead parser. If, on the contrary, operating in look-ahead mode is undesirable (NO), the process 900 proceeds to step 922 to continue reading data.

The step 912 runs a look-ahead parser. As described above, the look-ahead parser scans the input document until information required for formatting of the current element is obtained. The look-ahead parser may want to build a skeleton of the document tree to store a bare minimum of information. The parser may also use another approach to collect data. Several well-known methods of parsing documents may be used. Using a look ahead parser minimizes the data in memory to the extent possible. When the look-ahead parser gets required data, the look-ahead parser may need to restore the input stream to a state the stream was in before the parser started. This is necessary if the look-ahead parser has affected the state of the stream. The look-ahead parser should not interfere with operations of the main parser. When the look-ahead parser returns, the step 918 proceeds to the step 920.

The described loop continues until the step 922 finds a tag in the input stream. A tag means the end of the current element or the start of another child element. In that case, the process 900 advances to the step 212 and continues as it is described for the process 600.

In yet another embodiment of the invention, the processes 600, 700, and 900 may be combined to build a partial document tree and use a lookahead parser for formatting.

The embodiments may be computer implemented. The methods may be practiced using a conventional general-purpose computer system 1000, such as that shown in FIG. 10. The processes 600, 700, and 900 of FIGS. 6, 7, and 9 may be implemented as software, such as an application program executing within the computer system 1000. In particular, the steps of the noted method of are effected by instructions in the software that are carried out by the computer. The software may be divided into two separate parts; one part for carrying out the noted methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for parsing and formatting a document encoded using a markup language in a memory constrained environment in accordance with the embodiments of the invention.

Figure 10:
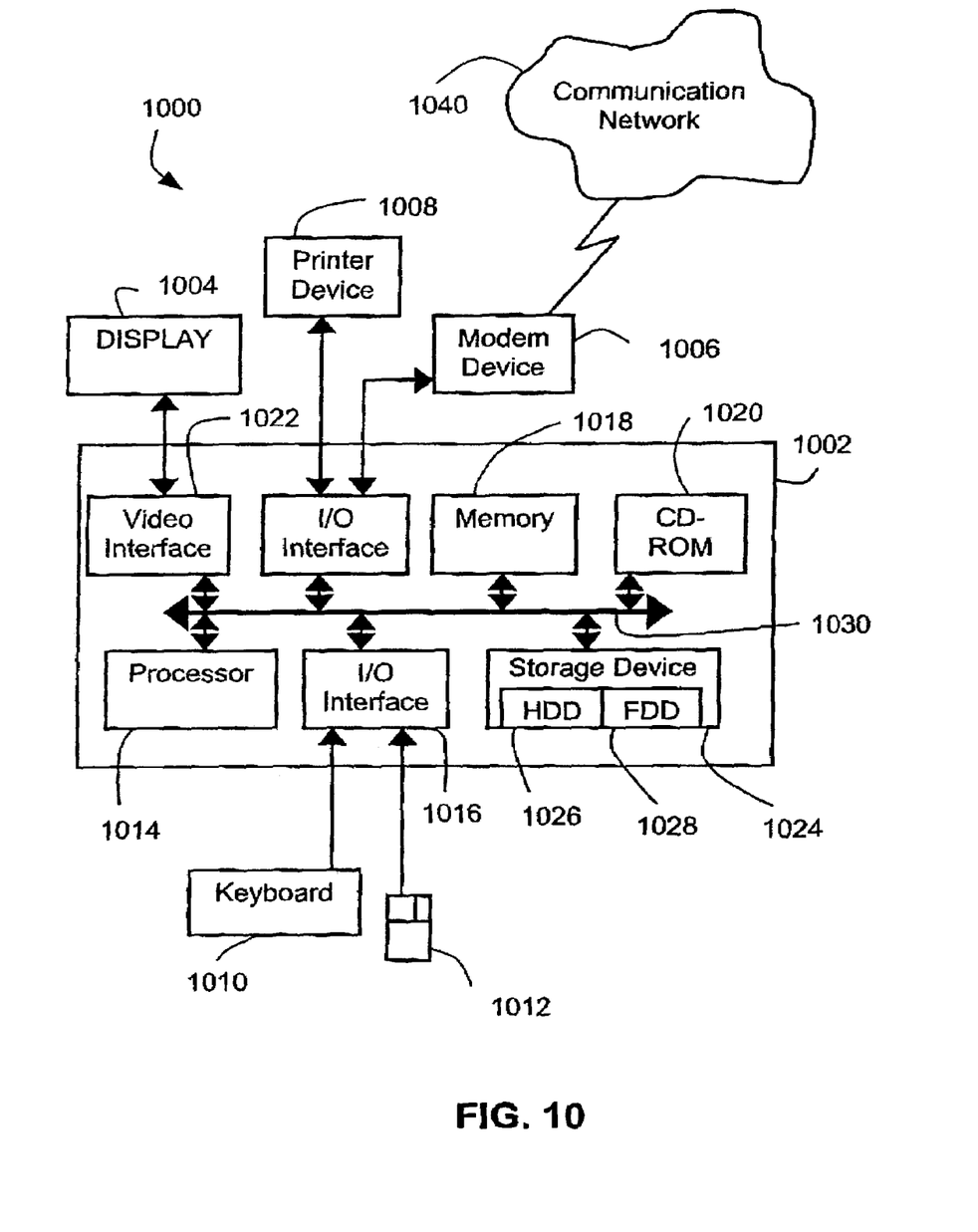
FIG. 10 is a block diagram of a general purpose computer with which embodiments of the invention may be practiced.

The computer system 1000 comprises a computer module 1002, input devices such as a keyboard 1010 and mouse 1012, output devices including a printer 1008 and a display device 1004. A Modulator-Demodulator (Modem) transceiver device 1006 is used by the computer module 1002 for communicating to and from a communications network 1040, for example connectable via a telephone line or other functional medium. The modem 1006 can be used to obtain access to the Internet, and other network systems, such as a Local Area Network (LAN) or a Wide Area Network (WAN).

The computer module 1002 typically includes at least one processor unit 1014, a memory unit 1018, for example formed from semiconductor random access memory (RAM) and read only memory (ROM), input/output (I/O) interfaces including a video interface 1022, and an I/O interface 1016 for the keyboard 1010 and mouse 1016 and optionally a joystick (not illustrated), and an interface for the modem 1006. A storage device 1024 is provided and typically includes a hard disk drive 1026 and a floppy disk drive 1028. A magnetic tape drive (not illustrated) may also be used. A CD-ROM drive 1020 is typically provided as a non-volatile source of data. The noted components of the computer module 1002, typically communicate via an interconnected bus 1030 and in a manner which results in a conventional mode of operation of the computer system 1000 known to those in the relevant art. Examples of computers on which the embodiments can be practised include IBM-PC's and compatibles, Sun Sparcstations or alike computer systems evolved therefrom.

Typically, the application program of the preferred embodiment is resident on the hard disk drive 1026 and read and controlled in its execution by the processor 1014. Intermediate storage of the program and any data fetched from the network 1040 may be accomplished using the semiconductor memory 1018, possibly in concert with the hard disk drive 1026. In some instances, the application program may be supplied to the user encoded on a CD-ROM or floppy disk and read via the corresponding drive 1020 or 1024, or alternatively may be read by the user from the network 1040 via the modem device 1006. Still further, the software can also be loaded into the computer system 1000 from other computer readable medium including magnetic tape, a ROM or integrated circuit, a magneto-optical disk, a computer readable card such as a PCMCIA card, and the Internet and Intranets including email transmissions and information recorded on websites and the like. The foregoing is merely exemplary of relevant computer readable mediums. Other computer readable media may be practiced without departing from the scope and spirit of the invention.

The methods 600, 700, and 900 may alternatively be implemented in dedicated hardware such as one or more integrated circuits performing functions or sub functions. Such dedicated hardware may include special purpose processors, digital signal processors, or one or more microprocessors and associated memories.

Thus, methods apparatuses and computer program products have been disclosed for parsing and formatting a document encoded using a markup language in a memory constrained environment. While only a small number of embodiments have been disclosed, it will be apparent to those skilled in the art in the light of this disclosure that numerous changes, modifications, and/or substitutions may be made without departing from the scope and spirit of the invention.

The claims defining the invention are as follows:

1. A method of parsing and formatting a document encoded using a markup language, the structure of said document being represented by a tree having one or more nodes, said method comprising the steps of:
   parsing the document to a current node in said tree using a main parser, freeing memory occupied by an previously formatted one of said nodes upon which formatting of said current node, according to a set of formatting rules, is independent and the formatting of said current node being dependent on one or more further nodes that have not yet been formatted, wherein a partial document tree uses the current node and remaining previously formatted nodes upon which formatting of said current node is dependent;
   obtaining information about said one or more further nodes of said document using a look-ahead parser operable so as to not interfere with operation of the main parser; and
   formatting said current node using said obtained information.

2. The method according to claim 1, further comprising the step of determining which of said one or more nodes is affected by said set of formatting rules.

3. The method according to claim 2, wherein said determining step utilizes one or more sequences of selectors, each sequence of selectors being related to one of said formatting rules, applied to sibling nodes of said document tree.

4. The method according to claim 2, wherein said determining step includes the step of searching each formatting rule in said set of formatting rules for said current node.

5. The method according to claim 1, further comprising the steps of formatting said document using said partial document tree and outputting said formatted document.

6. The method according to claim 1, wherein the look-ahead parser scans the encoded document to obtain information required for formatting the current node.

7. The method according to claim 1, wherein the look-ahead parser builds a skeleton of the tree to store a minimum of the obtained information.

8. The method according to claim 1, wherein the look-ahead parser receives a stream representing the encoded document, and the look-ahead parser restores the stream to a received state where the look-ahead parser has affected the state of the stream.

9. An apparatus for parsing and formatting a document encoded using a markup language, the structure of said document being represented by a tree having one or more nodes, said apparatus comprising:
   a memory device;
   a main parser for parsing said document to a current node in said tree and freeing memory of the memory device occupied by any previously formatted one of said nodes upon which formatting of said current node, according to a set of formatting rules, is independent, the formatting of said current node being dependent on one or more further nodes that have not yet been formatted, the main parser further forming a partial document tree that uses the current node and remaining previously formatted nodes upon which formatting of said current node is dependent;
   an obtaining unit for obtaining information about said one or more further nodes of said document using a look-ahead parser operable so as to not interfere with operation of the main parser; and
   a formatting unit for formatting said current node using said obtained information.

10. The apparatus according to claim 9, further comprising means for determining which of said one or more nodes is affected by said set of formatting rules.

11. The apparatus according to claim 10, wherein said determining means utilizes one or more sequences of selectors, each sequence of selectors related to one of said formatting rules, applied to sibling nodes of said document tree.

12. The apparatus according to claim 10, wherein said determining means comprises means for searching each formatting rule in said set of formatting rules for said current node.

13. The apparatus according to claim 9, further comprising means for formatting said document using said partial document tree and outputting said formatted document.

14. A computer readable storage medium having a computer program recorded therein for parsing and formatting a document encoded using a markup language, the structure of said document being represented by a tree having one or more nodes, said computer program comprising the steps of:
   parsing said document to a current node in said tree using a main parser, freeing memory occupied by any previously formatted one of said nodes upon which formatting of said current node, according to a set of formatting rules, is independent, and the formatting of said current node being dependent on one or more further nodes that have not yet been formatted, wherein a partial document tree uses the current node and remaining previously formatted nodes upon which formatting of said current node is dependent;
   obtaining information about said one or more further nodes of said document using a look-ahead parser operable so as to not interfere with operation of the main parser; and
   formatting said current node using said obtained information.

15. The computer readable storage medium according to claim 14 further comprising determining which of said one or more nodes affected by said set of formatting rules.

16. The computer readable storage medium according to claim 15, wherein said determining step utilizes one or more sequences of selectors, each sequence of selectors related to one of said formatting rules, applied to sibling nodes of said document tree.

17. The computer readable storage medium according to claim 15, wherein said determining step comprises searching each formatting rule in said set of formatting rules for said current node.

18. The computer readable storage medium according to claim 14, further comprising the steps of formatting said document using said partial document tree and outputting said formatted document.

* * * * *

UNITED STATES PATENT AND TRADEMARK OFFICE
CERTIFICATE OF CORRECTION

PATENT NO. : 7,313,758 B2
APPLICATION NO. : 10/421770
DATED : December 25, 2007
INVENTOR(S) : Kozlov It is certified that error appears in the above-identified patent and that said Letters Patent is hereby corrected as shown below:

COLUMN 2:
    Line 23, "layout" should read -- lay out --.

COLUMN 5:
    Line 33, "printer," should read -- a printer, --; and
    Line 54, "each" should read -- to each --.

COLUMN 6:
    Line 10, "star" should read -- start --; and
    Line 24, "layout" should read -- lay out --.

COLUMN 7:
    Line 36, "$E_1,$" should read -- $E_1$ --.

COLUMN 10:
    Line 28, " "?No"," should read -- "No", --;
    Line 29, "layout" should read -- lay out --; and
    Line 29, "proceeds" should read -- proceed --.

COLUMN 11:
    Line 18, "of are" should read -- are --.

COLUMN 12:
    Line 20, "sub functions." should read -- sub-functions. --;
    Line 24, "methods" should read -- methods, --; and
    Line 39, "an" should read -- a --.

UNITED STATES PATENT AND TRADEMARK OFFICE
CERTIFICATE OF CORRECTION

PATENT NO. : 7,313,758 B2
APPLICATION NO. : 10/421770
DATED : December 25, 2007
INVENTOR(S) : Kozlov It is certified that error appears in the above-identified patent and that said Letters Patent is hereby corrected as shown below:

<u>COLUMN 14:</u>
Line 29, "affected" should read -- is affected --.

Signed and Sealed this

Twenty-ninth Day of July, 2008

JON W. DUDAS
*Director of the United States Patent and Trademark Office*